United States Patent
Liverotti

(10) Patent No.: US 6,799,057 B1
(45) Date of Patent: Sep. 28, 2004

(54) GSM CELLULAR TERMINAL

(75) Inventor: Giorgio Liverotti, Pordenone (IT)

(73) Assignees: Telit Mobile Terminals S.p.A., Sgonico (IT); Dante Tognetti, Pordenone (IT)

( * ) Notice: Subject to any disclaimer, the term of this patent is extended or adjusted under 35 U.S.C. 154(b) by 0 days.

(21) Appl. No.: 09/601,982

(22) PCT Filed: Feb. 15, 1999

(86) PCT No.: PCT/IB99/00265

§ 371 (c)(1),
(2), (4) Date: Jan. 10, 2001

(87) PCT Pub. No.: WO99/41921

PCT Pub. Date: Aug. 19, 1999

(30) Foreign Application Priority Data

Feb. 16, 1998 (IT) .......................... PN98A0011

(51) Int. Cl.$^7$ ............................................. H09M 1/100
(52) U.S. Cl. .................... 455/558; 455/551; 455/552.1; 455/557
(58) Field of Search ................................ 455/551, 575, 455/89, 90, 33.2, 347, 348, 349, 550, 557, 186.1, 558, 552, 553; 379/354, 355, 356, 357

(56) References Cited

U.S. PATENT DOCUMENTS

| | | | | |
|---|---|---|---|---|
| 5,857,157 A | * | 1/1999 | Shindo | 455/551 |
| 5,875,404 A | * | 2/1999 | Messiet | 455/558 |
| 5,887,266 A | * | 3/1999 | Heinonen et al. | 455/558 |
| 5,956,653 A | * | 9/1999 | Lahti | 455/558 |
| 5,987,325 A | * | 11/1999 | Tayloe | 455/435 |
| 6,052,604 A | * | 4/2000 | Bishop et al. | 455/558 |
| 6,134,437 A | * | 10/2000 | Karabinis et al. | 455/427 |
| 6,167,271 A | * | 12/2000 | Parker et al. | 455/445 |
| 6,178,324 B1 | * | 1/2001 | Choquet et al. | 455/558 |
| 6,185,436 B1 | * | 2/2001 | Vu | 455/558 |
| 6,223,052 B1 | * | 4/2001 | Ali Vehmas et al. | 455/551 |
| 6,244,894 B1 | * | 6/2001 | Miyashita | 439/500 |
| 6,259,929 B1 | * | 7/2001 | Kuisma | 455/550 |
| 6,366,777 B1 | * | 4/2002 | Uusitalo | 455/433 |
| 6,480,551 B1 | * | 11/2002 | Ohishi et al. | 375/260 |
| 6,501,962 B1 | * | 12/2002 | Green | 455/558 |
| 6,584,326 B1 | * | 6/2003 | Boydston et al. | 455/558 |

FOREIGN PATENT DOCUMENTS

EP 669774 A1 * 8/1995 ............ H04Q/7/32

* cited by examiner

Primary Examiner—Pablo N. Tran
(74) Attorney, Agent, or Firm—Levine & Mandelbaum

(57) ABSTRACT

A GSM cellular terminal comprising antenna means, control means, signal processing means, where SIM cards can be associated with the signal processing means for connection to corresponding service networks, said GSM cellular terminal being apt to host several SIM cards simultaneously and switch between them. According to the present invention, corresponding respective signal processing means (BLK3, BLK3') can be associated with each SIM card.

10 Claims, 2 Drawing Sheets

GSM CELLULAR TERMINAL

DESCRIPTION

The present invention relates to a GSM cellular terminal comprising antenna means, control means, signal processing means, where SIM cards can be combined with the signal processing means for connection to corresponding service networks, said GSM cellular terminal being apt to host several SIM cards simultaneously and switch between them.

As it is known, GSM cellular terminals available on the market are usually capable of operation using only one SIM (Subscriber Identity Memory) card each time, so that each time they can be connected to one service network alone.

Thus, also in view of the ever increasing availability of new and different service opportunities, the subscriber is unable to activate the terminal, e.g. for both a call and response simultaneously on two different service types. Neither is it possible to use for instance an off-peak rate service simultaneously on the same terminal during working hours ("business" service) nor a lower rates service during evening hours ("family" service).

Other GSM cellular terminals are known, which make use of adapters apt to receive two SIM cards simultaneously. Said terminals allows for simultaneous use of both cards, but the use of one card will exclude the other.

It is the object of the present invention to solve the above drawbacks and provide a GSM cellular terminal having a more efficient and improved performance compared to the solutions already known.

In this frame, it is the main object of the present invention to provide a GSM cellular terminal, which is apt to allow a simultaneous use in transceiving mode of at least two service types associated with respective SIM cards.

In order to achieve such aims, it is the object of the present invention to provide a GSM cellular terminal incorporating the features of the annexed claims, which form an integral part of the description herein.

Further objects, features and advantages of the present invention will become apparent from the following detailed description and annexed drawings, which are supplied by way of non limiting example, wherein.

Figure 1:
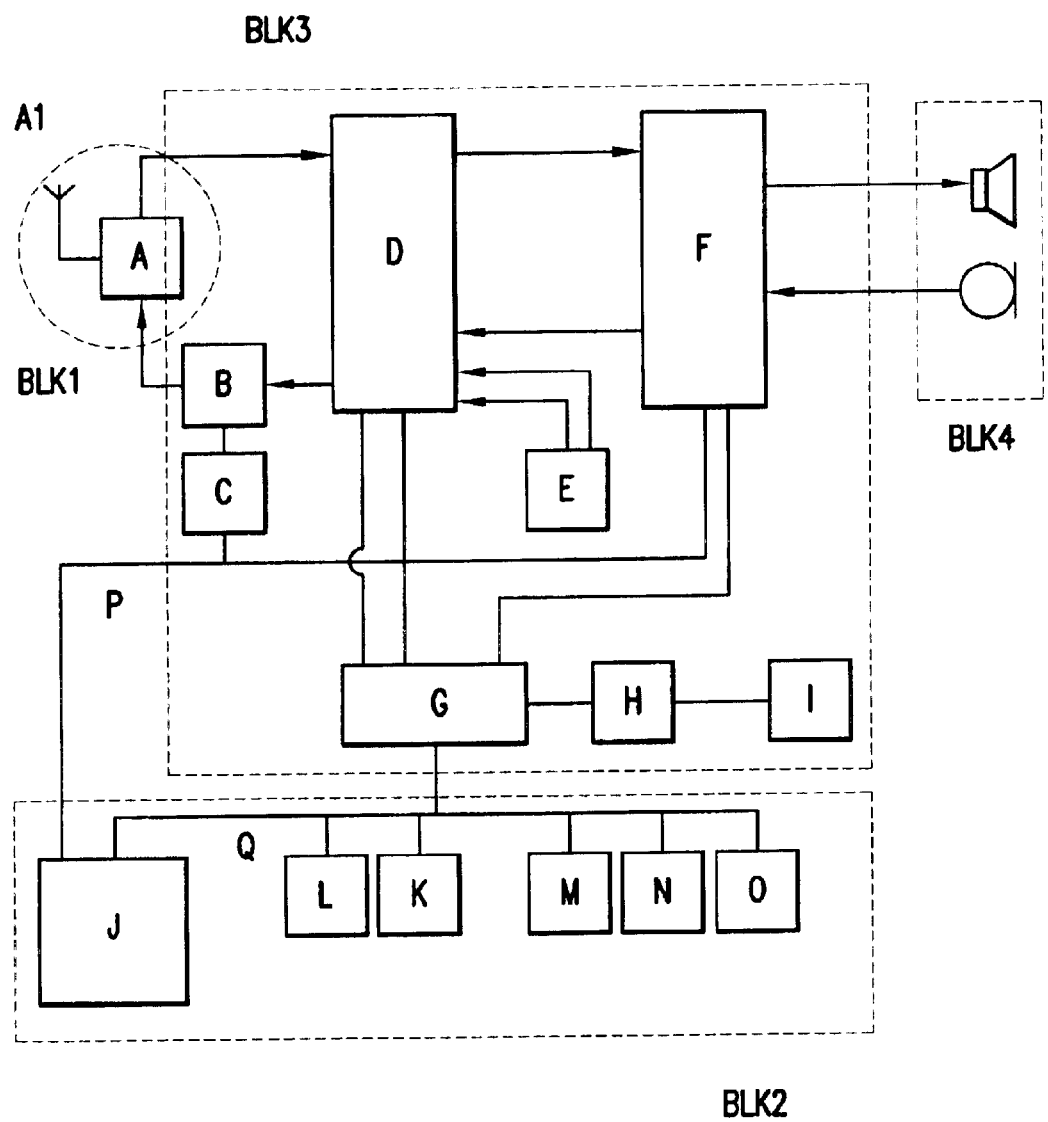
FIG. 1 shows a block diagram of a GSM cellular terminal according to the known state of the art.

FIG. 1 shows a block diagram of a GSM cellular terminal according to the present invention, where in said block diagram an antenna block BLK1 contains an antenna A1 and a duplex input filter A. This antenna block BLK1 is connected to a control block BLK2, which comprises a microcontroller unit J, a keyboard unit K, a display unit L, a ROM program memory unit M, a RAM memory unit N and a nonvolatile EEPROM memory O.

A signal processing block BLK3 is also provided, comprising a power amplifier B, a power controller C, a transceiver D, a frequency synthesizer E, a base-band block F, a digital signal processing unit G, a SIM card represented by a corresponding SIM card housing I and finally a hardware interface H of the SIM card.

Finally, an actuation block BLK4 will contain the final actuators, i.e. a loudspeaker and a microphone.

A control bus of the transceiver P interconnects the signal processing block BLK3 to the control block BLK2, whereas a system control bus Q inside the control block BLK2 will carry the signals related to the elements located therein.

For a better understanding of the present invention, the block diagram shown in FIG. 1 is substantially representative of all GSM cellular terminals already known. Therefore, for the purposes of the present invention it is not relevant whether connection between the various elements is either as illustrated in FIG. 1 or a different one, or still whether some elements are integrated between them. For instance, it is not relevant whether the keyboard unit K or the display unit L are directly connected to the hardware interface H of the SIM card, or whether such a connection goes through the digital signal processing unit G as illustrated in FIG. 1.

Figure 2:
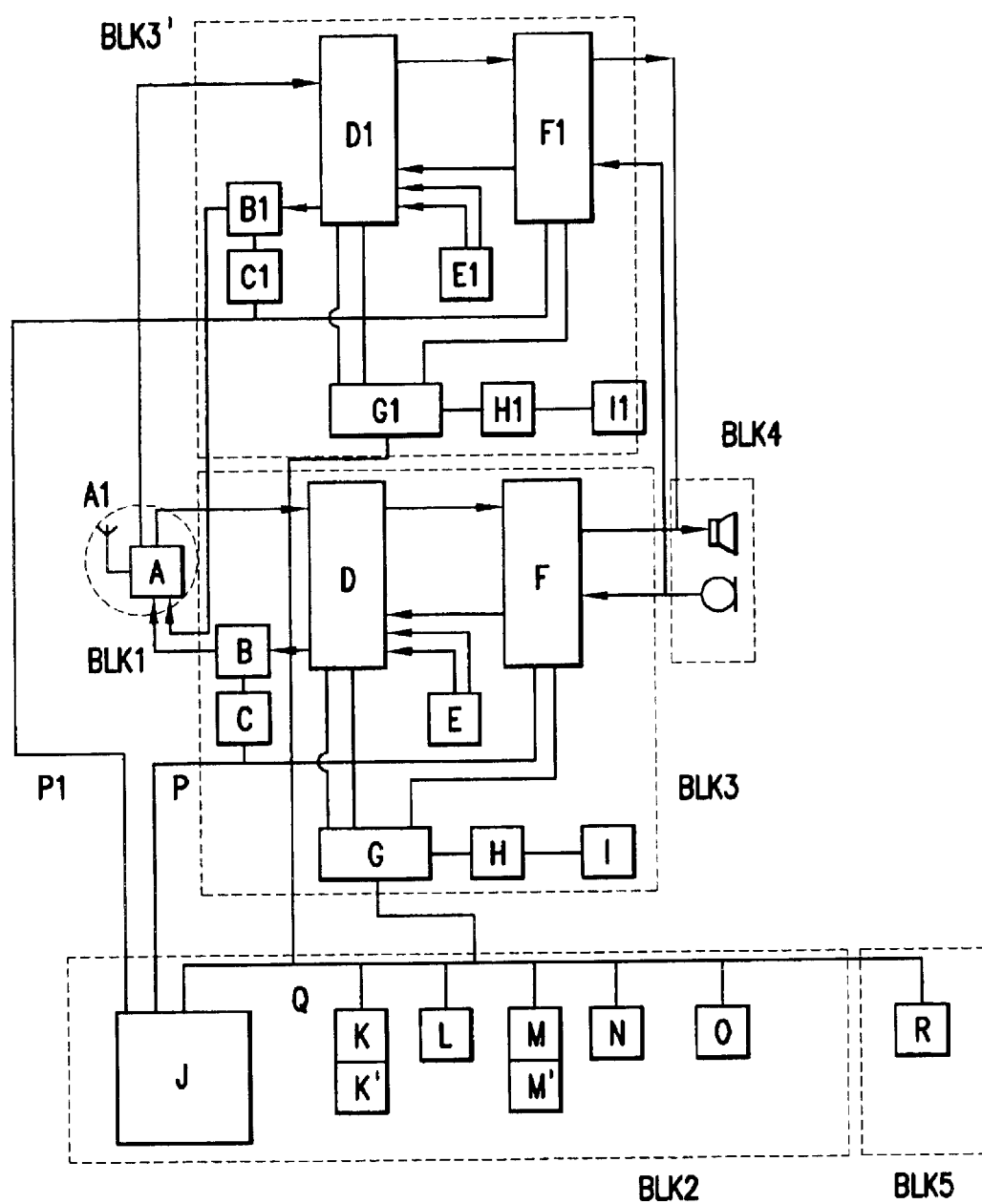
FIG. 2 shows a basic diagram of a GSM cellular terminal according to the present invention.

FIG. 2 shows a block diagram of a GSM cellular terminal according to the present invention, where the antenna block BLK1 is similar to the antenna block shown in FIG. 1, the same as it is for the actuation block BLK4. A signal processing block BLK3 containing the same elements of FIG. 1 is provided; moreover, a second processing block BLK3' contains a second power amplifier B1, a second power controller C1, a second transceiver D1, a second frequency synthesizer E1, a second base band unit F1, a second digital signal processing unit G1, a second hardware interface H1 of the SIM card and a second SIM card housing I1.

On the contrary, the control block BLK2 has a program memory unit M containing an additional software program M' assigned for the multiple management of the SIM cards that are eventually inserted in the housings I and I1. Moreover, the control block BLK2 contains an additional keyboard segment K' to send or select the call transmission towards or from the SIM card associated with the signal processing block BLK3 or towards or from the SIM card associated with the second signal processing block BLK3'. The keyboard segment K' is thus a multifunction send and/or selection key.

A detector block BLK5 containing an optical detector R indicates the addition of a device, which is apt to signal the various operating procedures of the GSM cellular terminal to the subscriber with reference to the various SIM cards in use. It is obvious that the function of said detector block BLK5 can be obtained through the optical or even acoustic devices the GSM cellular terminal usually has on issue.

Moreover, the GSM cellular terminal according to the present invention shown in FIG. 2 has a second control bus for the transceiver P1, which connects the signal processing block BLK3' to the control block BLK2. Said second control bus of the transceiver P1 can be physically obtained extending the control bus of the transceiver P.

Operation of the GSM cellular terminal according to the present invention is as follows: the additional software program M' is a program for managing the cards system and it also controls the signals sent to the second control bus of the transceiver P1. The additional software program M' allows management of two transceiver channels, one related to the signal processing block BLK3 and the other to the second signal processing block BLK3'. The additional software program M' will then supervise for each of these two transceiver channels the known initialization, research, recording operations and any other function already known required for correct terminal operation.

Moreover, said additional software program M' also supervises the specific functions of the GSM cellular terminal according to the present invention, i.e.:

a selection function of the activated channel;

a primary function either to deactivate or put on hold one of the two activated channels, while the other channel is in communication;

a highlighting function of the activated and selected channel;

a managing function of the optical and/or acoustic signals related to the activated channels;

a managing function of the access priorities to the index lists related to both SIM cards.

From the above description the features of the present invention are clear, and also clear are its advantages.

Advantageously, the GSM cellular terminal according to the present invention allows independent management of two or more SIM cards on one GSM cellular terminal alone. Such a management, in virtue of the availability of several transceiver circuits, can be a simultaneous one, i.e. calls can be received or made using both or more SIM cards simultaneously.

Advantageously, the various SIM cards usable with the GSM cellular terminal according to the present invention can be associated with different tariff types freely referred to a sole service provider or various service providers, anyway in compliance with the subscriber's agreement activations towards the service providers chosen by the subscriber. This will ensure several flexibility and saving levels in using the services supplied by the various providers or by a single provider as described above as well as allow for possible additional performances presently not available in automatic mode. For instance, the use of several SIM cards will lead to a larger territory coverage using SIM cards from two different providers. Similarly, coverage will also be possible in other countries using different GSM transmission standards, such as the United States.

The availability of the second transceiver device will in fact advantageously allow to preset it for its operation with a different standard.

It is obvious that many changes are possible for the man skilled in the art to the GSM cellular terminal described above by way of example, without departing from the novelty spirit of the innovative idea, and it is also clear that in practical actuation of the invention the components may often differ in form and size from the ones described and be replaced with technical equivalent elements.

The describing block diagrams of the GSM cellular terminal may change through the future technologic developments in microelectronics, which will lead through a natural integration process to the manufacture of terminals with equivalent circuitry consisting of a sole electronic component with equivalent multiple functions.

Similarly, future service provision and usage levels will also lead to a plurality of customized SIM cards, integrated on the same physical support, but the resulting diagram of the cellular terminal cannot be considered different for this reason from the one described above by way of example. Switching between integrated SIM cards on the same physical support will be performed through a special manual switch or software.

The additional keyboard segment to select call transmission towards the SIM card can consist of a sole multifunction key.

What is claimed is:

1. A GSM cellular terminal comprising antenna means, control means, signal processing means, and a plurality of SIM card readers, where corresponding SIM cards can be inserted for connection to corresponding service networks, wherein said GSM cellular terminal comprises at least two separate signal processing means, said at least two separate signal processing means comprising corresponding SIM card readers, and being adapted to simultaneously maintain connections of their respective SIM cards to said corresponding service network, supervised by said control means.

2. A GSM cellular terminal according to claim 1, wherein said signal processing means comprise signal reception and transmission means.

3. A GSM cellular terminal according to claim 2, wherein said control means comprise program memory means associated with a management program of the plurality of SIM card readers and of the corresponding signal reception and transmission means.

4. A GSM cellular terminal according to claim 3, wherein said SIM cards can be integrated in one sole physical support.

5. A GSM cellular terminal according to claim 3, wherein said control means comprise a keyboard unit, which has an additional keyboard segment for the transmission of signals being able to switch among the plurality of SIM cards.

6. A GSM cellular terminal according to claim 5, wherein said additional keyboard segment is a specific multifunction send and/or selection key.

7. A GSM cellular terminal according to claim 3, further comprising optical and/or acoustic signaling means to indicate which SIM card can be used for transmission-reception by the subscriber.

8. A GSM cellular terminal according to claim 7, wherein said optical and/or acoustic signaling means are integrated in standard signaling means included in the GSM cellular terminal.

9. A GSM cellular terminal according to claim 3, wherein said program memory comprises one or more of the following functions:

a selection function of the activated channel;

a primary function either to deactivated or put on hold one of the two activated channels, while the other channel is in communication;

a highlighting function of the activated selected channel;

a managing function of the optical and/or acoustic signals related to the activated channels;

a managing function of the access priorities to the index lists related to both SIM cards.

10. A GSM cellular terminal according to claim 3, wherein the signal processing means are separate and able to receive different signal types.

* * * * *